(12) United States Patent
Herman et al.

(10) Patent No.: US 8,714,981 B2
(45) Date of Patent: May 6, 2014

(54) AUTOMATIC TRACE ANALYSIS AND COMPARISON SYSTEM FOR INTERACTIVE LEARNING AND TRAINING SYSTEMS

(75) Inventors: Peter Q. Herman, Antony (FR); Laurent Grimaldi, Noisy-le-Grand (FR)

(73) Assignee: Sinapse Print Simulators, Saint Aubin Cedex (FR)

( * ) Notice: Subject to any disclaimer, the term of this patent is extended or adjusted under 35 U.S.C. 154(b) by 1406 days.

(21) Appl. No.: 12/416,723

(22) Filed: Apr. 1, 2009

(65) Prior Publication Data

US 2009/0253114 A1   Oct. 8, 2009

Related U.S. Application Data

(60) Provisional application No. 61/041,787, filed on Apr. 2, 2008.

(51) Int. Cl.
*G09B 19/00*   (2006.01)

(52) U.S. Cl.
USPC ........... 434/118; 434/322; 434/323; 434/350; 434/353; 434/362; 706/16; 706/19; 706/25; 706/27; 706/32; 706/47

(58) Field of Classification Search
USPC ................ 434/118, 322, 323, 350, 353, 362; 706/16, 19, 25, 27, 32, 47
See application file for complete search history.

(56) References Cited

U.S. PATENT DOCUMENTS

| | | | |
|---|---|---|---|
| 5,411,271 A * | 5/1995 | Mirando | 463/9 |
| 6,321,215 B1 * | 11/2001 | Tseng et al. | 706/16 |
| 6,511,326 B1 * | 1/2003 | Galanter et al. | 434/322 |
| 6,685,476 B1 * | 2/2004 | Safran, Sr. | 434/169 |
| 7,904,017 B2 * | 3/2011 | Maron et al. | 434/362 |
| 2001/0034592 A1 * | 10/2001 | Herman | 703/13 |
| 2001/0044098 A1 * | 11/2001 | Johnson et al. | 434/323 |
| 2002/0132209 A1 * | 9/2002 | Grant et al. | 434/118 |
| 2002/0197594 A1 * | 12/2002 | Dickmeyer et al. | 434/322 |
| 2003/0054324 A1 * | 3/2003 | Fountain | 434/37 |
| 2003/0078765 A1 * | 4/2003 | Hoffmaster | 703/22 |
| 2004/0018479 A1 * | 1/2004 | Pritchard et al. | 434/350 |
| 2004/0029092 A1 * | 2/2004 | Orr et al. | 434/354 |
| 2004/0191746 A1 * | 9/2004 | Maron et al. | 434/323 |

(Continued)

FOREIGN PATENT DOCUMENTS

| | | |
|---|---|---|
| EP | 0335030 A2 | 10/1989 |
| WO | WO-00/38140 A1 | 6/2000 |
| WO | WO-01/57700 A2 | 8/2001 |

OTHER PUBLICATIONS

Mao et al., "Intelligent tutoring system for symbolic calculation", 1992, Lecture Notes in Computer Science, vol. 608/1992, 132-139.*

(Continued)

*Primary Examiner* — Jack Yip
(74) *Attorney, Agent, or Firm* — Dickstein Shapiro LLP

(57) ABSTRACT

A learning and training process that memorizes traces of a learner solving an exercise, attaches meta labels to the learner traces, and compares the learner traces to reference traces of a referent solving the exercise, meta labels being attached to the reference traces.

16 Claims, 10 Drawing Sheets

(56) References Cited

U.S. PATENT DOCUMENTS

| | | | |
|---|---|---|---|
| 2005/0282138 A1* | 12/2005 | Dittli | 434/362 |
| 2006/0099563 A1* | 5/2006 | Liu et al. | 434/350 |
| 2006/0194182 A1* | 8/2006 | Anand | 434/322 |
| 2006/0210957 A1* | 9/2006 | Maron | 434/353 |
| 2007/0166674 A1* | 7/2007 | Kochunni et al. | 434/236 |
| 2008/0050704 A1* | 2/2008 | Hau et al. | 434/156 |
| 2008/0318200 A1* | 12/2008 | Hau et al. | 434/362 |
| 2009/0068631 A1* | 3/2009 | Halliwell | 434/362 |
| 2009/0286218 A1* | 11/2009 | Johnson et al. | 434/353 |

OTHER PUBLICATIONS

M. Draman, "A generic architecture for intelligent simulation training systems," Simulation Symposium, 1991, Proceedings of the 24th Annual, New Orleans, LA; Apr. 1-5, 1991; IEEE Comput. Soc. US, Apr. 1, 1991, Los Alamitos, CA, pp. 30-38.

F. Kabanza et al., "Implementing tutoring strategies into a patient simulator for clinical reasoning learning," Artificial Intelligence in Medicine, Elsevier, NL, vol. 38, No. 1, Sep. 1, 2006, pp. 79-96.

A.D. Malony et al., "Traceview: A trace visualization tool", IEEE Software USA, vol. 8, No. 5, Sep. 1991, pp. 19-28.

* cited by examiner

AUTOMATIC TRACE ANALYSIS AND COMPARISON SYSTEM FOR INTERACTIVE LEARNING AND TRAINING SYSTEMS

CROSS-REFERENCE TO RELATED APPLICATIONS

This application claims the benefit of U.S. Provisional Application 61/041,787 filed on Apr. 2, 2008.

FIELD OF THE INVENTION

Embodiments described herein relate generally to processes or systems used for learning, and more specifically to a process or system used for learning how to use a device or a process, or learning how to control or drive an industrial, chemical, or mechanical process.

BACKGROUND OF THE INVENTION

Systems and processes for learning how to control an industrial process already exist. Such systems typically comprise a computer simulating the industrial process through simulation exercises, and generating traces for each action of a learner trying to solve one of the exercises.

Nevertheless, these systems require that a teacher spends a lot of time reading and studying the traces, in order to check if the exercise has been correctly solved and to see what are the difficulties of the learner. The goal of the invention is to present a process and system for providing more efficient learning and training.

BRIEF SUMMARY OF THE INVENTION

An aspect of the invention concerns a learning and training process, comprising, storing traces of a learner solving an exercise as learner traces on a computer-readable memory, attaching meta labels to the learner traces, and using a computer processor to compare the learner traces to reference traces of a referent solving the exercise, meta labels being attached to the reference traces.

In this document, a user can be a referent or a learner. The referent can be an instructor, a trainer, a training coordinator, a normative user, an expert, an average user or a student (typically the best student among a group of students). The learner (or trainee) is typically a student. The meta labels are preferably structured XML meta labels.

The comparison step can comprise deducing actions forgotten by the learner in relation to those carried out by the referent, and/or deducing unnecessary actions done by the learner in relation to those carried out by the referent, and/or comparing the sequence in which problems of the exercise were solved, and/or the use of a template file specifying a precision level for comparing the learner traces to the reference traces, and/or expressing in percentage a variance between referent results and the learner results; the results can comprise a virtual time for solving the exercise, virtual costs of the exercise and/or statistics on number of learner and referent actions concerning this exercise.

The exercise can be created by the referent. The reference traces can be created by the referent by memorizing referent traces of the referent solving the exercise, and attaching meta labels to the referent traces.

The meta labels of the learner traces can be memorized in a learner trace file, and the meta labels of the referent traces can be memorized in a referent trace file, the referent and learner trace files containing preferably only key words which are independent of the learner language.

The exercise can comprise one or more problems to solve. The referent traces can comprise at least one trace corresponding to an action that is not necessary to solve the one or more problems. The exercise can contain a set of sequential situations, each situation containing one or more problems to solve, the learner having to solve each problem in a situation before moving on to the next situation.

The process according to the invention can comprise, at the end of each situation, generating a summary for that situation including the results of the learner concerning this situation. The results can comprise a virtual time for solving the situation, virtual costs of the situation and/or statistics on number of learner actions concerning this situation.

The process according to the invention can comprise a display of the referent traces and/or the learner traces on a display device, the process according to the invention comprising the step of filtering the displayed traces in order to display the traces corresponding to a given problem and/or situation, and/or corresponding to a given type of action made by the referent and/or the learner to solve the exercise.

The process according to the invention can comprise a display of both reference and learner traces at the same time. The process according to the invention can be implemented, for example, in the graphic arts industry as a print simulator.

Another aspect of the invention concerns a learning and training system implementing a process according to the invention. More precisely, another aspect of the invention concerns a learning and training system comprising a computer readable memory that stores traces of a learner solving an exercise, a part that attaches meta labels to the learner traces, and a computer processor configured to compare the learner traces to reference traces of a referent solving the exercise, meta labels being attached to the reference traces.

The meta labels can be structured XML meta labels.

The compute process can be configured to determine actions forgotten by the learner in relation to those carried out by the referent, and/or determine unnecessary actions done by the learner in relation to those carried out by the referent, and/or compare the sequence in which problems of the exercise were solved, and/or determine a percentage of variance between referent results and the learner results; the results can comprise a virtual time for solving the exercise, virtual costs of the exercise and/or statistics on number of learner and referent actions concerning this exercise.

The system according to the invention can comprise a device for creating the exercise.

The system according to the invention can store referent traces of the referent solving the exercise on computer readable memory, and attach meta labels to the referent traces.

The meta labels of the learner traces can be stored in a learner trace file, and the meta labels of the learner traces can be stored in a referent trace file, the referent and learner trace files containing preferably only key words which are independent of the learner language.

The exercise can comprise one or more problems to solve. The referent traces can comprise at least one trace corresponding to an action that is not necessary to solve the one or more problems.

The exercise can contain a set of sequential situations, each situation containing one or more problems to solve, the learner having to solve each problem in a situation before moving on to the next situation. The processor can be configured to, at the end of each situation, generate a summary for that situation including the results of the learner concerning this situation. The results can comprise a virtual time for solving the situation, virtual costs of the situation and/or statistics on number of learner actions concerning this situation.

The system according to the invention can comprise a display device that displays the referent traces and/or the learner traces. The process can be configured to filter the displayed traces in order to display the traces corresponding to a given problem and/or situation, and/or corresponding to a given type of action made by the referent and/or the learner to solve the exercise The display device can be arranged for displaying both reference and learner traces at the same time.

The processor can be configured to use a template file specifying a precision level for comparing the learner traces to the reference traces.

The system according to the invention can be, for example, a print simulator.

Another aspect of the invention concerns a learning and training system implementing a process according to the invention. More precisely, another aspect of the invention concerns a learning and training system comprising a means for memorizing traces of a learner solving an exercise, a means for attaching meta labels to the learner traces, and a means for comparing the learner traces to reference traces of a referent solving the exercise, meta labels being attached to the reference traces.

Other advantages and characteristics of the invention will appear upon examination of the detailed description of embodiments which are no way limitative, and of the appended drawings.

DETAILED DESCRIPTION OF THE INVENTION

Embodiments described herein address the problems with current systems and processes for learning. The following are example embodiments. It should be understood that embodiments of the invention are not limited by the example embodiments and that changes can be made thereto.

Referring to FIGS. 1-12, a process for automatically comparing the outputs of interactive learning systems so as to analyze the solution path of a trainee (also named learner) with regard that of a referent or "normative" user (expert, "average user", instructor, training coordinator, best student among a group of students, etc), and a system for the same is now described. The system takes as input the output from the learning system sessions and provides as output a variable depth analysis of the comparative results in such a manner as to enable the instructor to have a "quick overview" of all the trainee results compared to the "norm", and then to further analyze and compare any pair of results to see where they vary. These results are then used to "re-orient" the trainee if necessary or to validate their progress so that they may move on to the next stage of their learning process according to the invention. The current example is oriented towards systems which teach problem-solving for process control operators, and more particularly the printing and packaging process fields. The invention also covers a system which implements the process according to the invention.

The more general application of this invention is to any learning system in which the history of the learning session can be seen as the exploration of a non-directed graph, and where the trainee actions can be given <<meta-labels>> which serve as a basis for later comparison. Examples of such meta-labels are: "display process output"; "use process quality control tool"; "check on value of current process variable"; "adjust value of current process variable"; "ask for diagnostic help from the supervisory system"; "give a 'quality' evaluation which states that the product is of good quality."

Depending on the simulated process, the meta-labels can be changed without affecting the underlying solution methods to this general problem of comparing output from interactive learning systems (simulators, other interactive e-learning systems, etc.).

Figure 1:
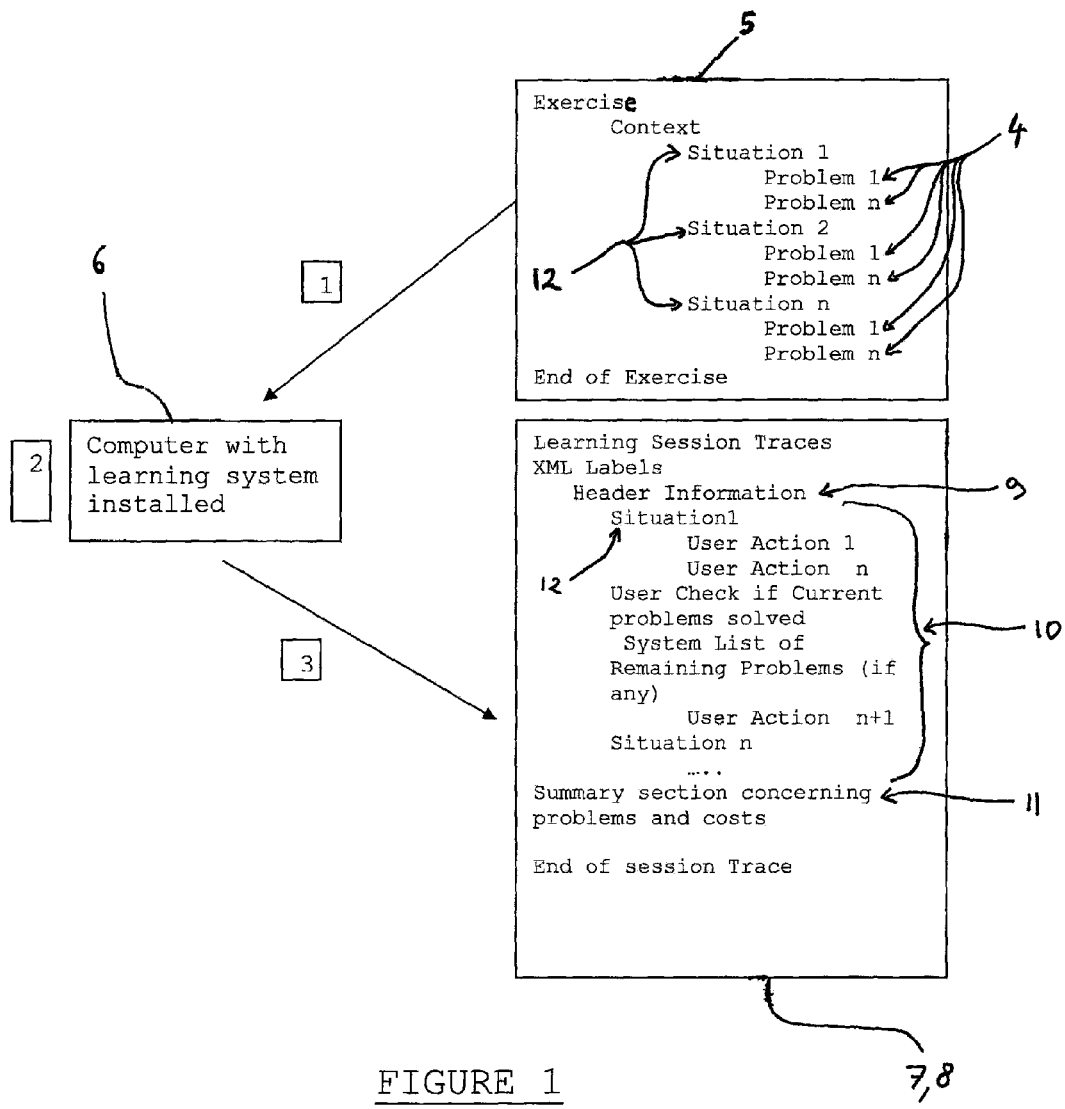
FIGS. 1 and 2 are schematic views of a process according to the invention.

A general overview of the system architecture is now provided with reference to FIG. 1. The simulator system 6 comprises a computer, arranged for implementing a learning and training program; the learning and training program typically comprises a program for simulating a process (or "simulator program") through exercises to be solved by the trainee, preferably an industrial production process, and a trace analysis and comparison program, an interface console connected to the computer, this interface allowing a user to interact with the computer and with the process simulated by the computer in order to solve the exercise; a given interaction between the user and the computer via the console corresponds to a given action of the user on the simulated process.

The interface console is specific to the training proposed by the system 6, and can typically comprise a real console table that could be used to control a real press in a newspaper print industry site, if the system 6 simulates a press, or a dashboard of a plane, if the system 6 simulates an airplane flight, or a keyboard, etc.

The computer comprises a central processing unit, an analogical circuit and/or an digital circuit arranged to implement the memorization, meta labels attachment, trace generation, summary generation, comparison, deduction, expression, filtering or filter activation steps of the process according to the invention, and a screen arranged to implement the visualization and display steps of the process according to the invention.

Figure 2:
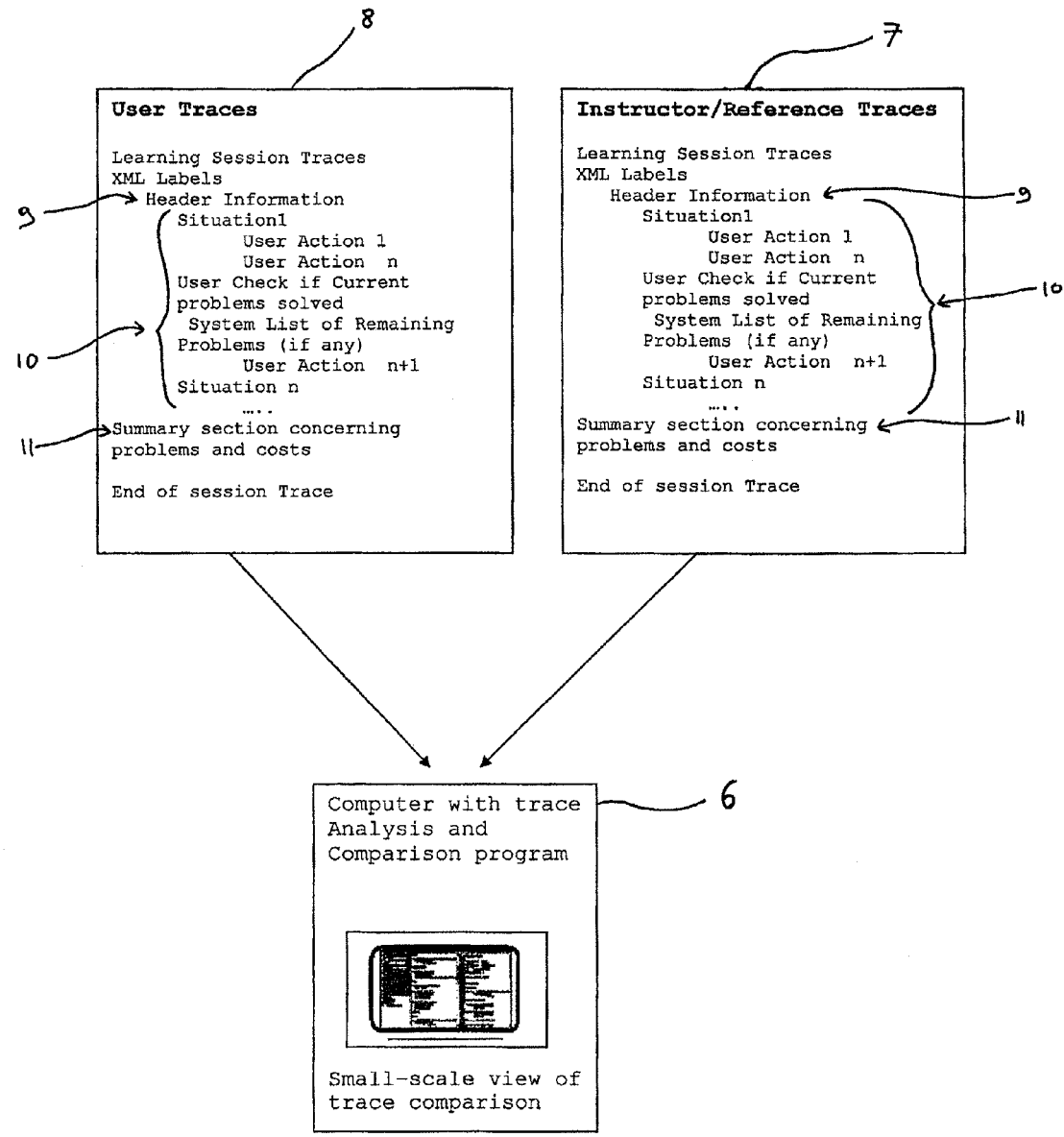

As illustrated in FIGS. 1 and 2, the preferential realization mode of the process according to the invention comprises the successive following steps A, B and C.

At step A, the instructor or training coordinator creates a problem 4 to be solved, more precisely at least one problem to be solved. This at least one problem is part of an exercise 5. The contents of the exercise 5 are linked to the learning goals at that stage and for that student or group of students. The instructor then solves the problem, or can designate the pre-existing solution of one of the other students as the <<reference solution>>.

To create a solution (whether it is the <<reference>> or <<learner>> version), the following steps are followed: (1) the problem definition is loaded by the learning system 6 (for example, the press training simulator); (2) the user solves the exercise; (3) During this learning and problem-solving session, the learning system 6 memorizes all the traces 7 of the resolution and attaches structured XML meta labels to them.

At step B, the student (or learner or trainee) tries to solve the exercise: (1) the problem definition is loaded by the learning system 6 (for example the press training simulator); (2) the user (i.e. the learner) solves the exercise; (3) during this learning and problem-solving session, the learning system memorizes all the traces 8 of the resolution and attaches structured XML meta labels to them. This is the same set of steps as those followed by the instructor.

At step C, the instructor analyzes the solution steps for the student by using the Trace Comparison System 6. The instructor decides which set of traces to compare and analyzes one 7 from the "reference solution" and one 8 from a student solution. These two sets of traces are loaded by the system 6, and the instructor can then analyze the results of the trace comparison by using the system 6 in one or more of the following modes: comparative overview of the solution (high level summary information only); choice of lower level information to compare (though application of <<pre-programmed" types of filters which show or hide this type of information); line by line scrolling though the traces (at whatever level the filter are set: from all possible trace information to only some classes of trace information); automated comparison in two side-by side windows of the Instructor traces vs the user traces (the depth of information displayed is controlled by the active/inactive filters).

Next, report generation is described with reference to FIG. 2. The flexibility of the meta label definitions, which can be adapted to various subject domains and applications, makes it extremely easy to evolve and enrich the system 6. The examples described herein have been implemented for the graphic arts industry, and in particular for a line of training simulators, but is obvious that the same type of approach can be applied to other learning systems which produce traces for later analysis.

An example embodiment utilizes a set of meta labels which are independent of the type of problem to be solved. These meta labels structure the learning session traces in three sections: the header 9; the problem resolution 10; and the summary 11.

The header 9 contains all the contextual information about the exercise, including (a) which "Course" (named group of exercises); (b) which "Exercise" (specific set of problems to solve or questions to answer); (c) the user name; (d) the language (English, French, Spanish, . . . ); and (e) the date on which this was done.

As shown in FIGS. 1 and 2, an exercise can be conceptualized as a "scenario" containing a set of sequential "situations" 12, each situation containing one or more problems 4 to solve. In this implementation the user (learner or referent) has to solve each problem in a situation 12 before moving on to the next situation 12. The same structural aspects are found in the metalabels, Exercise, Situation, Problem, User Action, etc.

At end of each situation the learning program generates a summary 11 for that situation (and will of course generate a summary 11 for the session as a whole). This summary 11 gives an overview of the "quality" of the solution. The summary includes: (a) the results (why the situation ended—no more problems, predefined limits exceeded in terms of time, cost or amount produced); (b) information relative to the session (if a production simulation: quantity of good and bad product produced, etc); (c) the <<virtual time>> for the situation (these can be included on times assigned to each user action as well as the machine production time), the simulated process <<downtime>> due to simulator machine breakdowns, and when the user has carried out specific actions, a subtotal for these actions; (d) the Costs of the situation including costs for bad quality product as well as downtime costs; and (e) statistics on number of user actions, number or machine stops, etc. The overall session summary will include the subtotals for each situation.

For the problem solving, a large proportion of the meta labels can be domain specific. If we take the example of print simulators (our first and preferred embodiment of this invention), we have defined the following high level categories for User Actions: "Console Action" (press console—could also be Cockpit adjustments for a Flight simulator); "Manual Action" (on the production machine—here a printing press, could be a numerically controlled machine (NCM) tool); the display of simulated output (a "print copy" for a print simulator, a machined piece for a NCM simulator); the "display type for the output" (for a print copy: the whole printed sheet, one page, current print compared to "soft proof"—for other systems, the current output, perhaps in comparison to the desired output); the "quality control tools" used (for printing: magnifier, densitometer, spectrophotometer, etc; for other domains, calipers, laser distance measurements, etc.); the user of the "diagnostic help system" and the depth of help accessed (fault name, potential causes, location of the fault, actual cause, suggested remedy, etc.); outside events occurring during the learning sessions (there can be triggered by the operator, the trainer or the system itself), but are not part of the "predefined exercise." Each of these categories contains subcategories which contain all the necessary information for the instructor and for the automatic trace comparison system; the ensemble of these categories is sufficient for the purposes of evaluating the learner's problem resolution.

A summary of the trace types and structures is now provided. The system allows a global overview and synthesis of the learning session traces for a given exercise. This is done by visualizing the header 9 information, the actions "forgotten" or "unnecessary" on the part of the learner (these are differences with the "reference" trace), the summary information for each situation, and the order in which problems were solved within each situation ("best practice" generally requires that in manufacturing processes, process stability take precedence over product quality, etc.) and the comparison of these sequences between reference and learner traces.

The system permits the instructor to get a quick overview of the learner results, and thus decide what the strengths and weaknesses of a particular learner may be, and which learners are having the most problems and need the most immediate attention. If this "overview" level proves insufficient, and/or the instructor wishes to do a more detailed analysis of the leaning sessions, the appropriate "filters" can be activated to show the lower level data for both sets of traces (reference and learner).

Example navigation functions within the trace files are now described. One of the primary functions is to allow navigation (visualization at different file positions). To this end, the system allows the user to chose a part of the resolution and then "unfold" it to see the full level of detail. More generally, with regard to the full set of traces and their labels, each type of meta label can be "unfolded" or "refolded" so that the full levels of detail are visible. The user traces; in whatever their current level of display, can be saved at any time to external text files for later treatment or consultation. The instructor can also "position" themselves in the trace file in respect to a specific type of meta-label and level of detail; when these are chosen in either the reference or user traces, the system then displays the same sort of data in the other trace file. Of course if the information is not present in the other file, there will be no corresponding display.

A description of automatic comparison is now provided. In our example embodiment domain (print simulators), one of the basic comparison points is the display of the simulated output. It is at this time that the learning program automatically generates a list of current production problems. This list includes both problems due to the predefined exercises and those which have been caused by user action or inaction. By comparing the problems present in these lists (between two displays of the output), the system deduces the problems solved in the interval between the two displays. By then comparing the actions of the reference and learner traces, the system deduces those which are common to both and those which are not.

For each problem resolution step, the system can thus deduce actions or controls "forgotten" by the learner in relation to those carried out by the referent (those actions or controls not carried out by the learner in relation to those carried out by the referent), and actions or controls that are "unnecessary"—and thus time consuming and cost generating—done by the learner. In addition, the system does a direct comparison of the summary information of each situation, and of the exercise as a whole, expressing in percentages the learner results (number of actions, costs) and the variance between the referent and the learner.

A description of an example use of system 6 is now provided. In the prior steps, the instruction has created an exercise (structured learning situation), and the reference traces (or has adopted one set of existing results as being the reference). The learner has solved (or tried to solve) the exercise, thus producing a trace file, Now the instructor wishes to analyze and compare these two trace files.

As an illustration, a simple exercise with only one situation and only one problem to solve within that situation is provided. In this example, implemented for the graphic arts industry, the system 6 is a press simulator. Here the problem is one of "color-to color registration", the color involved is Cyan, and the print unit involved is tower n°2, front side of the web, and in this case page n°1 of the newspaper.

Figure 3:
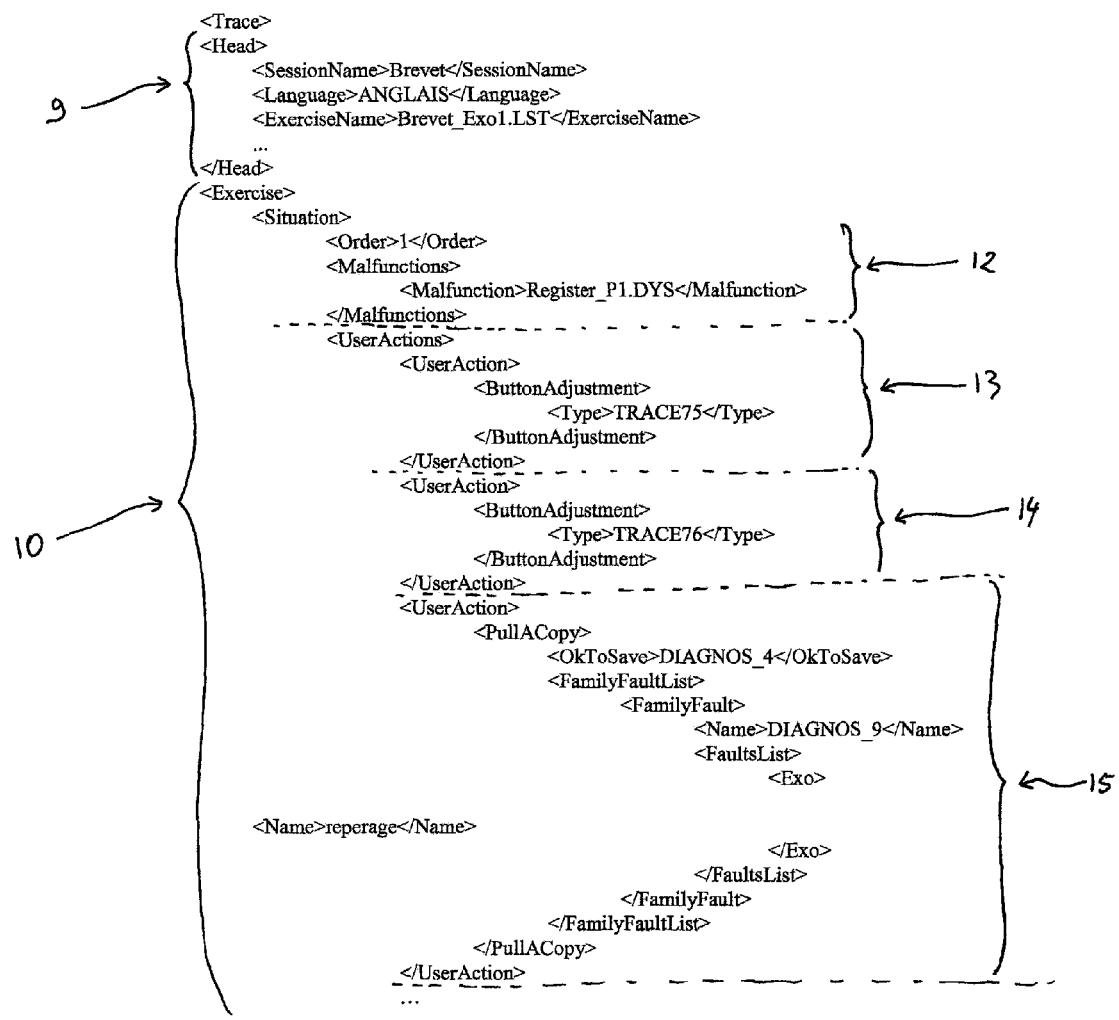
FIG. 3 illustrates part of a learner trace file generated by a process according to the invention.

FIG. 3 illustrates is an example of the XML traces generated by the simulator 6, and the meta labels used. The file corresponds to the start of the XML trace file which constitutes our example. The file contains the headers 9 for the "general information", then the description of the first situation 12, and after that it shows the description of three user actions 13, 14, 15. The first two actions 13, 14 concern the start-up of the machine, and the third 15 is the user display of the simulated output. It can be noted that the third action also shows the automatic diagnosis of current production faults (or of the fact that there are none). It should also be noted that there is no "surface" text in these XML files, they contain only key words which are independent of the user language, and which are replaced by the appropriate terms in the user language when the file is interpreted and visualized by the system. This is important, as it permits an instructor that speaks one language (English, for example) to analyze the traces of a solution done in a different language, such as Chinese.

Figure 4:
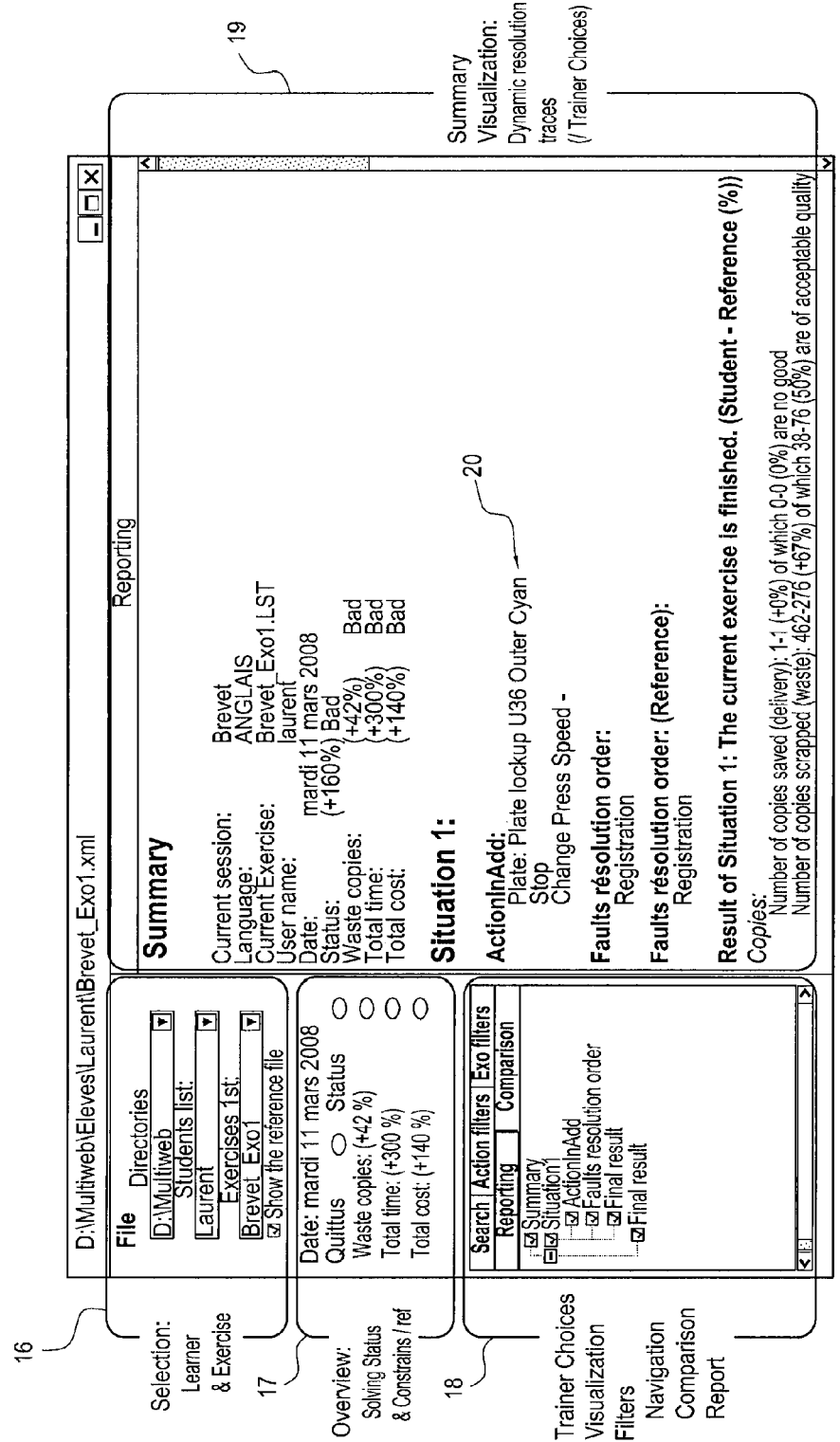
FIGS. 4-12 illustrate various displays implemented by a process according to the invention.

Next, examples of the system's possibilities are provided in reference to FIG. 4. The system (trace comparison and analysis) has four primary display and control zones. As shown in FIG. 4, Zone 16 is for selecting traces to analyze and compare (labeled "Selection"). Zone 17 is for displaying and giving global results of the comparison (trainee waste compared to reference waste, etc—labeled "Overview"). Zone 18 is for viewing perspective and depth (Filters, search keys, comparisons, reports). This zone 18 gives trainer choices on display and visualization contents and level of detail (labeled "Trainer Choices"). Zone 19 is for comparison of learner and reference trace resolutions (labeled "Summary"). Zone 19 displays and visualized traces according to the choices made in the other three zones. In zone 19, it is possible to navigate through the listing. For example in Zone 19, labeled the "Summary", we see that the user did an unnecessary action 20 (ActionInAdd), and that their total cost was 140% of the reference cost.

Figure 5:
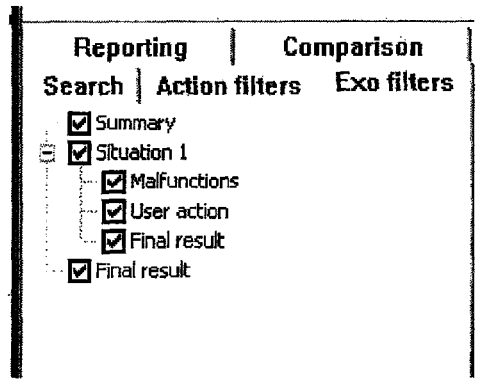

As illustrated in FIG. 5, at the highest level of selection the instructor can determine, by using zone 18, which kinds of information will be displayed and visualized. Here we see that all the types of information will be visualized. The following examples illustration how the choice is made for the level of detail visualized for each type of information.

Figure 6:
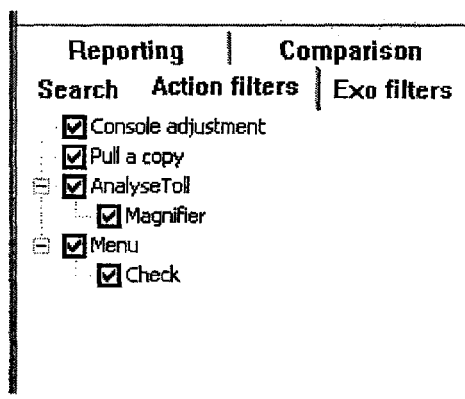

FIG. 6 illustrates an example visualization for the actions and their filters. As illustrated in FIG. 6, we can see that the instructor can choose the degree to which he wishes to see the various types of actions, be they on the control console, on the Quality Analysis tools, or on the machine checks and adjustments not available from the control console (Menu-Check).

Figure 7:
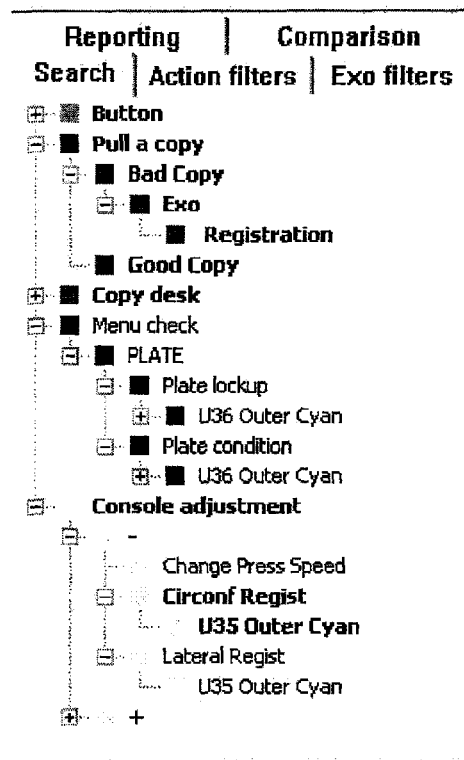

FIG. 7 shows search/position criteria, which determine the "intelligent" research in the trace files. The various categories of interaction are shown. On the user interface, these may be color-coded for easier recognition. The only interactions shown are those which actually took place—they are the only ones pertinent for search within these particular traces. "Intelligent" search and position means that if, for example, the instructor wishes to be positioned on the first check (menu check) carried out both by instructor and user, this becomes possible by choosing the appropriate item in the list. If the instructor wishes to see where in their detailed list of interaction the first control of "plate condition" was done, this also is possible. The resulting position in the trace file, then allows to see all the context of interaction before and after this position and thus to analyze it in context if necessary (ex. criticize method, not just results).

Figure 8:
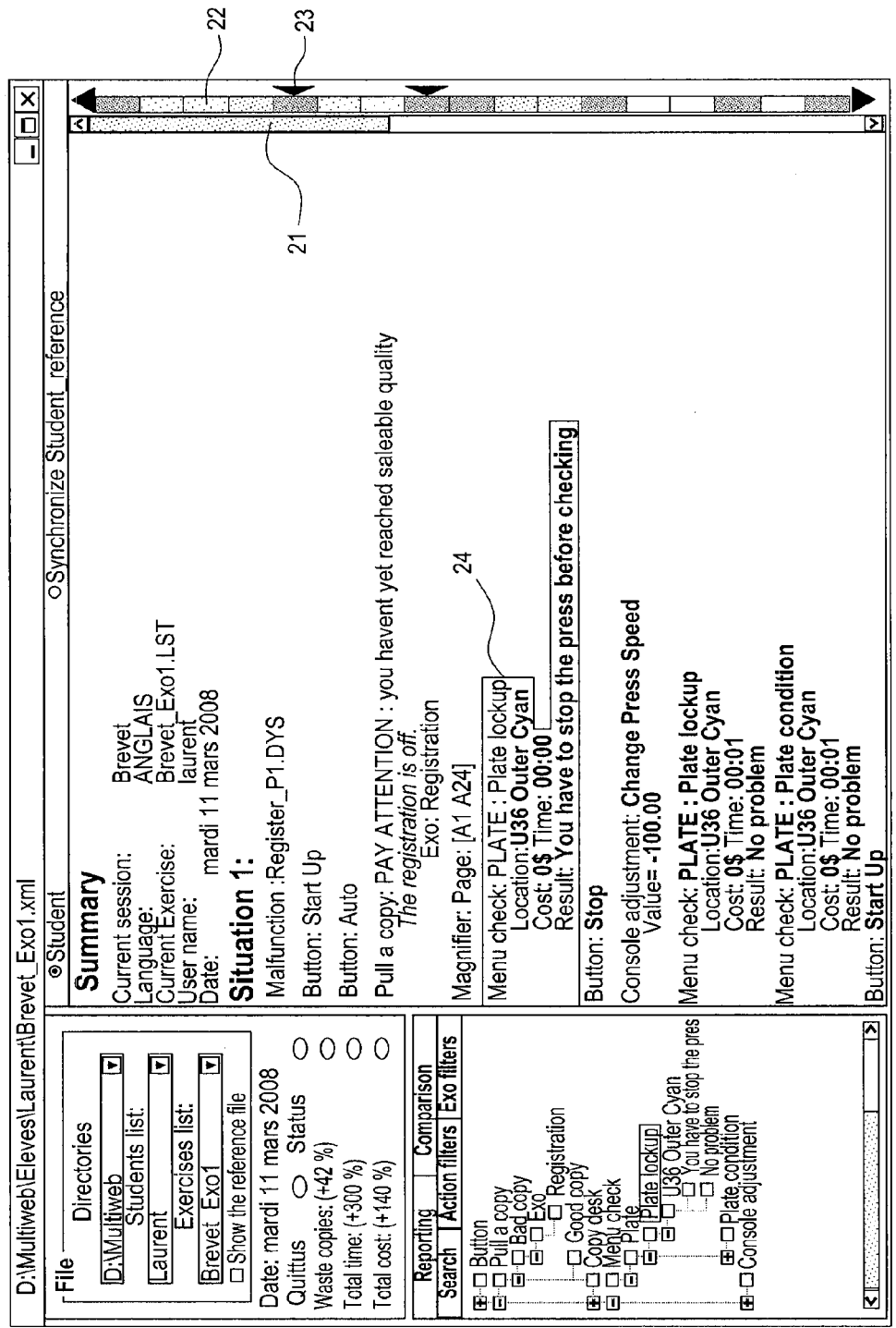

FIG. 8 illustrates navigation options. As illustrated in FIG. 8, the scroll bar 21 enables movement within the displayed data, and the ability to see the context in which the chosen search item was embedded. The color-coded bar 22 on the right of the file provides an overview of the types of trace information (same color coding as in the search criteria). The position markers 23 on the color-coded bar reflect the recent selections. The current selection 24 is highlighted (in this case it is "plate lockup"). It may also blink (not shown).

Figure 9:
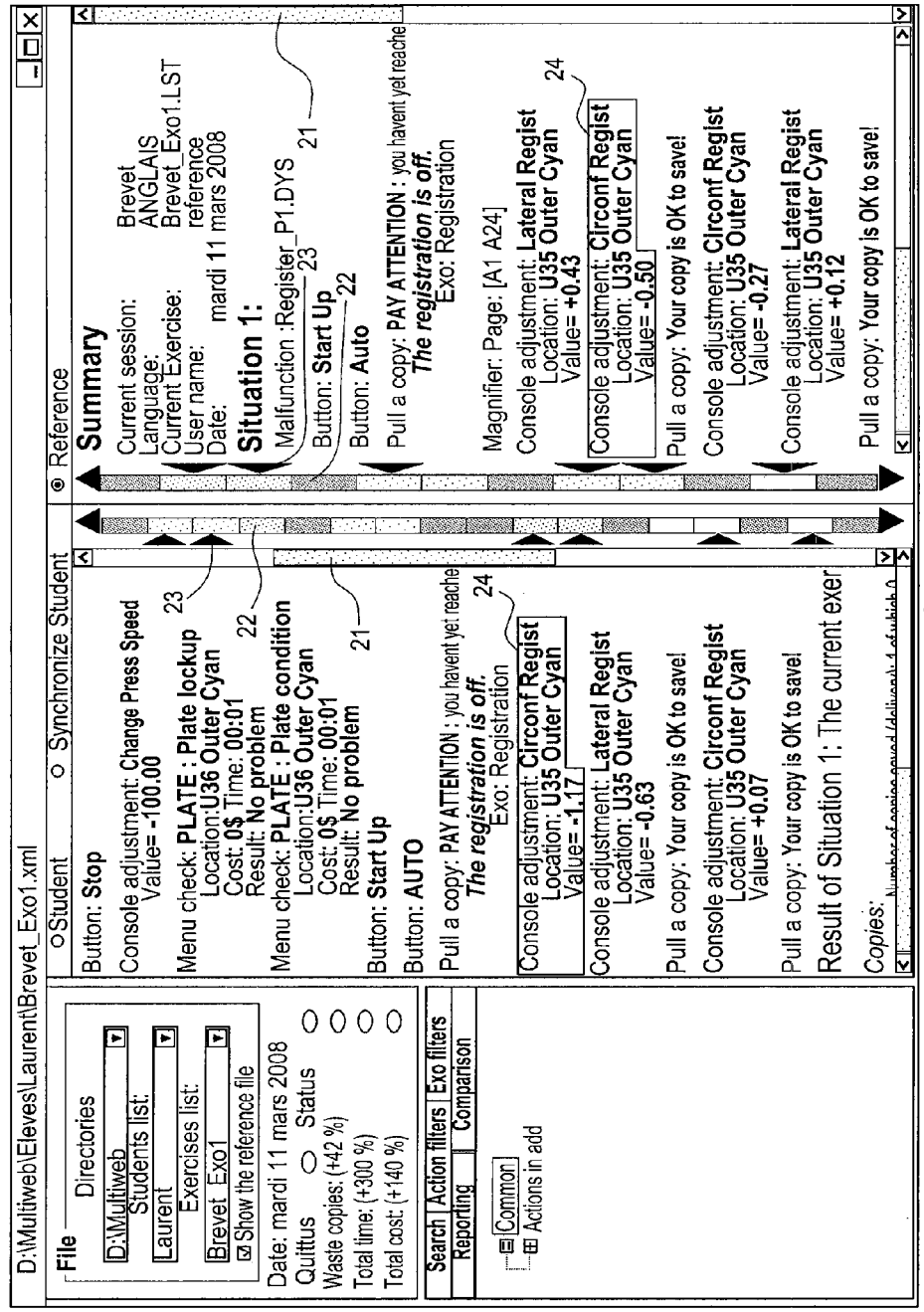

On the visualization illustrated in FIG. 9, both reference and student traces are shown at the same time. This makes it even easier for the instructor to analyze the reasons for the differences between the two. When the "common" visualization parameter is selected from among the "comparison" parameters, the same action done by both student and referent are highlighted. This example display shows that that they were not done in the same sequence of actions.

Actions (potentially unnecessary) done by the learner but not by the referent will be highlighted if the "Actions In Add" parameter is selected (not selected in FIG. 9). For example, in FIG. 8, you will notice that the learner performed additional actions, in particular stopping the press to check on the plate position, which the referent did not do—this changes the final costs considerably. As for other items, the current selection may "blink" as well as being highlighted.

Figure 10:
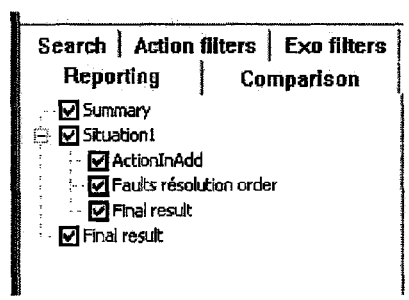

FIG. 10 illustrates the report visualization filters. As shown in FIG. 10, when the automatically generated reports are displayed, the level of detail of these can be chosen by selecting the appropriate parameters from among the "Reporting Filters." For example, if the unnecessary actions by the learner are not interesting to the instructor for the report to be generated, the ActionInAdd filter will be deselected.

All information shown in the "visualization" zones can be saved as a text file and printed out as necessary. This makes it possible to have a full and formal track of all training results for each trainee.

A second example of use of the system 6 is now described, with regard to its differences compared to the first example. This second example uses a simple exercise with only one situation and only two problems to solve within that situation. In this example, implemented for the graphic arts industry, the system 6 is a press simulator simulating the print of products such as newspapers or books.

Here the problems to solve are: a wrong console adjustment of an Ink Screw, leading to an inking fault, and a mechanical problem of the simulated press, the Cutting Anvil being worn, leading to dog ears and crooked Cross Fold.

In prior steps, the instructor has created the exercise (structured learning situation), and the instructor is the referent and has created the reference traces (or has adopted one set of existing results as being the reference). The learner has solved (or tried to solve) the exercise, thus producing a trace file.

As previously, each trace of a user corresponds to an action done by the user (the user being the referent or the learner) onto the simulated process via the interface console of the system 6, or corresponds to a result of one of these actions. In other words, for each action of a user interacting with the simulated process via the interface console of the system 6, the system generates and memorizes: a trace for this action (for example in the traces below, the action can be the use of the Start Up Button for starting the press, the action of pulling a copy of the product printed by the press, the use of the Stop Button for stopping the press, the action of checking the Folding Knife Condition, the action of checking the Cutting Anvil Condition, the action of Changing the knife cutting anvil, the action of adjusting an Ink Screw and the quantification of the adjustment, the action of using a Densitometer for measuring a color density corresponding to an ink screw, the action of using the help menu, the use of the Emergency Button for stopping the press), and a trace for the result of this action if any (for example in the traces below, the result can be a warning that there are inking faults and/or crocked folds and/or dog ears on the product when the user pulls a copy of the product printed by the press, warning if there is a problem or not after checking the Folding Knife Condition or the Cutting Anvil Condition, measured color densities when the user uses a Densitometer, the displayed message when the user uses the help menu, a time and/or penalty time and/or cost and/or penalty cost of an action).

Each action belongs preferentially to one of these categories: an action of modifying something in the simulated printing process (for example the use of the Start Up Button for starting the press, the use of the Stop Button for stopping the press, the use of the Emergency Button for stopping the press, the action of Changing the knife cutting anvil, the action of adjusting an Ink Screw and the quantification of the adjustment); an action of observing something in the simulated printing process (for example the action of pulling a copy of the product printed by the press, the action of checking the Folding Knife Condition, the action of checking the Cutting Anvil Condition); or an action of measuring something in the simulated printing process (for example the action of using a Densitometer for measuring a color density corresponding to an ink screw)

For each memorized trace (referent trace or learner trace), the system 6 attaches structured XML meta labels to this trace.

Below is an example of the referent traces generated by the simulator 6 and memorized in a referent trace file. For a better clarity, these traces are not shown with the used XML meta labels which are independent of the learner language:

---

Current session:
Language: English
Current Exercise: demo.LST
User name:    reference
Date:    February 16$^{th}$, 2008
Situation 1
Malfunction :demo1.DYS
Malfunction :demo2.DYS
Button: Start Up
Button: Auto
Button: Auto
Pull a copy: PAY ATTENTION : you haven't yet reached saleable quality
    You have to find an inking fault(s).
        Exo: Inking
    The folds are off.
        Exo: Cross Fold crooked
    There are dog ears.
        Exo: Dog-ear
Button: Stop
Menu check: FOLDING_COLLECTING_CYLINDER : Folding Knife Condition
    Location: 1
    Cost: 0    Time: 00:00
    Result: No problem
Menu check: FOLDING_COLLECTING_CYLINDER : Cutting Anvil Condition
    Location: 1
    Cost: 0    Time: 00:00
    Result: Cutting anvil worn.
Menu action: FOLDING_COLLECTING_CYLINDER : Change knife cutting anvil
    Location: 1
    Cost: 0    Time: 00:00
    Result: ACTION ACCOMPLISHED
Button: Start Up
Button: Auto
Button: Auto
Pull a copy: PAY ATTENTION : you haven't yet reached saleable quality
    You have to find an inking fault(s).
        Exo: Inking
Visualization mode: 1 Page + Color OK
Magnifier: Page: A1
Console adjustment: Ink Screw N∅

-continued

```
    Location: U35 Outer Magenta FS
    Value = +0.00, +0.00, −16.00, −17.00, −19.00, −21.00, +0.00, +0.00
Pull a copy: Your copy is OK to save!
Result of Situation 1: The current exercise is finished.
Copies:
    Number of copies saved (delivery): 21 of which 0 are no good
    Number of copies scrapped (waste): 427 of which 30 are of acceptable quality
Time:
    Run time: 00:05
    Web break and folder jam time: 00:00
    Checks and actions time: 00:00
    HelpLevelTime: 00:00
    TOTAL TIME: 00:05
    Multimedia Time: 00:00
Costs:
    Delivered copies cost: 3
    Wasted copies cost: 64
    Web break and folder jam cost: 0
    Checks and actions cost: 0
    Material Machine cost: 62
    HelpLevelCost: 0
    TOTAL COST: 129
Statistics:
    Number of console adjustments: 1
    Number of menu check: 2
    Number of menu action: 1
    Number of press stop: 0
Final result: The current exercise is finished.
Copies:
    Number of copies saved (delivery): 21 of which 0 are no good
    Number of copies scrapped (waste): 427 of which 30 are of acceptable quality
Time:
    Run time: 00:05
    Web break and folder jam time: 00:00
    Checks and actions time: 00:00
    HelpLevelTime: 00:00
    TOTAL TIME: 00:05
    Multimedia Time: 00:00
Costs:
    Delivered copies cost: 3
    Wasted copies cost: 64
    Web break and folder jam cost: 0
    Checks and actions cost: 0
    Material Machine cost: 62
    HelpLevelCost: 0
    TOTAL COST: 129
Statistics:
    Number of console adjustments: 1
    Number of menu check: 2
    Number of menu action: 1
    Number of press stop: 0
```

The referent solves the mechanical problem before the inking problem, because the mechanical problem is more critical: it could lead to a paper jam in the press and damage the press. The referent traces also comprise an action that is not necessary to solve any problem of the exercise. The referent checks the Folding Knife Condition, whereas the Folding Knife has no problem. This is because the Folding Knife is the more usual cause of folding problems, and a good student should know that and should check the Folding Knife Condition before checking the Cutting Anvil condition.

Below is an example of the learner traces generated by the simulator 6 in a learner trace file. For a better clarity, these traces are not shown with the used XML meta labels which are independent of the learner language:

```
Current session:
Language: English
Current Exercise: demo.LST
User name:      laurent
Date:       February 16th, 2008
Situation 1
Malfunction :demo1.DYS
Malfunction :demo2.DYS
Button: Start Up
Button: Auto
Button: Auto
Pull a copy: PAY ATTENTION : you haven't yet reached saleable quality
        You have to find an inking fault(s).
            Exo: Inking
```

-continued

```
        The folds are off.
            Exo: Cross Fold crooked
        There are dog ears.
            Exo: Dog-ear
Visualization mode: Display 8 page
Visualization mode: 2-Page Section
Visualization mode: 1 Page + Color OK
Densitometer:
    Page: C1
    Screw N° 4
    Density:
        Cyan: 0.90
        Magenta: 1.18
        Yellow: 0.85
        Black: 1.05
Console adjustment: Ink Screw Nø
    Location: U35 Outer Magenta FS
    Value = +0.00, +0.00, −11.00, −11.00, −11.00, −11.00, +0.00, +0.00
Pull a copy: PAY ATTENTION : you haven't yet reached saleable quality
    You have to find an inking fault(s).
        Exo: Inking
    The folds are off.
        Exo: Cross Fold crooked
    There are dog ears.
        Exo: Dog-ear
Densitometer:
    Page: C1
    Screw N° 5
    Density:
        Cyan: 0.90
        Magenta: 0.98
        Yellow: 0.85
        Black: 1.05
Console adjustment: Ink Screw Nø
    Location: U35 Outer Magenta FS
    Value = +0.00, +0.00, −3.00, −3.00, −9.00, −9.00, +0.00, +0.00
Pull a copy: PAY ATTENTION : you haven't yet reached saleable quality
    The folds are off.
        Exo: Cross Fold crooked
    There are dog ears.
        Exo: Dog-ear
Help: Level 7 : + How to repairs the problem
    Penalty time: 00:30
    Penalty cost: 59
Menu check: FOLDING_COLLECTING_CYLINDER : Cutting Anvil Condition
    Location: 1
    Cost: 0      Time: 00:00
    Result: You have to stop the press before checking.
Button: Emergency
Menu check: FOLDING_COLLECTING_CYLINDER : Cutting Anvil Condition
    Location: 1
    Cost: 0      Time: 00:00
    Result: Cutting anvil worn.
Menu action: FOLDING_COLLECTING_CYLINDER : Change knife cutting anvil
    Location: 1
    Cost: 0      Time: 00:00
    Result: ACTION ACCOMPLISHED
Button: Start Up
Button: Auto
Button: Auto
Pull a copy: Your copy is OK to save!
Result of Situation 1: The current exercise is finished.
Copies:
    Number of copies saved (delivery): 15 of which 0 are no good
    Number of copies scrapped (waste): 705 of which 14 are of acceptable quality
Time:
    Run time: 00:06
    Web break and folder jam time: 00:00
    Checks and actions time: 00:00
    HelpLevelTime: 00:30
    TOTAL TIME: 00:36
    Multimedia Time: 00:00
Costs:
    Delivered copies cost: 2
    Wasted copies cost: 105
    Web break and folder jam cost: 0
    Checks and actions cost: 0
    Material Machine cost: 450
    HelpLevelCost: 59
    TOTAL COST: 617
```

-continued

```
Statistics:
    Number of console adjustments: 2
    Number of menu check: 2
    Number of menu action: 1
    Number of press stop: 0
Final result: The current exercise is finished.
Copies:
    Number of copies saved (delivery): 15 of which 0 are no good
    Number of copies scrapped (waste): 705 of which 14 are of acceptable quality
Time:
    Run time: 00:06
    Web break and folder jam time: 00:00
    Checks and actions time: 00:00
    HelpLevelTime: 00:30
    TOTAL TIME: 00:36
    Multimedia Time: 00:00
Costs:
    Delivered copies cost: 2
    Wasted copies cost: 105
    Web break and folder jam cost: 0
    Checks and actions cost: 0
    Material Machine cost: 450
    HelpLevelCost: 59
    TOTAL COST: 617
Statistics:
    Number of console adjustments: 2
    Number of menu check: 2
    Number of menu action: 1
    Number of press stop: 0
```

The system 6 compares the learner traces and the referent traces. This comparison uses a C++ algorithm using XML meta labels, and a template file which specifies the precision level of the comparison.

This comparison algorithm is arranged for reading the referent trace file and, for each referent action of the referent traces, looking for the same action in the learner trace file, and then deducing actions not carried out or forgotten by the learner in relation to those carried out by the referent; the template file specifies the precision level of the comparison. For example, if the referent trace file comprises a trace of adjusting an Ink Screw for a given color with a given value, and if the learner trace file comprises a trace of adjusting the same Ink Screw for the same color but with a different value, the system 6 concludes that the adjusting trace is not missing in the learner traces, because the template file specifies that the number of the screw and the adjusted color are important for the comparison but not the value of the adjustment;

The comparison algorithm is also arranged reading the learner trace file and, for each learner action of the learner traces, looking for the same action in the referent trace file, and then deducing unnecessary actions done by the learner but not carried out by the referent. The template file specifies the precision level of the comparison. For example, if the referent trace file comprises only one trace of adjusting an Ink Screw for a given color, and if the learner trace file comprises many traces of adjusting the same Ink Screw for the same color, the system 6 concludes that the supplementary adjusting actions are not unnecessary actions done by the learner, because the template file specifies that the number of adjustments does not matter.

The comparison algorithm is also arranged for reading the learner trace file and deducing a learner problem resolution sequence, reading the referent trace file and deducing a referent problem resolution sequence, and then comparing the sequences in which problems were solved by the learner and by the referent, that is deducing the difference(s) between the learner sequence and the referent sequence The comparison algorithm is also arranged for reading the learner trace file and the referent trace file and deducing in percentage a variance between referent results and the learner results, these results comprising for example a virtual time for solving the exercise, virtual costs of the exercise and/or statistics on number of learner and referent actions concerning this exercise The system 6 collects and memorizes all this deduced information in an Overview file that comprises the following information:

```
Summary
Current session:
Language: French
Current Exercise: demo.LST
User name:     laurent
Date:     February 16th, 2008
Status:     (+351%)     Bad
Waste copies:     (+57%)     Bad
Total time: (+620%)     Bad
Total cost: (+378%)     Bad
Situation1:
ActionInAdd:
    Emergency
ActionForgeted:
    Stop
        FOLDING_COLLECTING_CYLINDER : Folding Knife Condition 1
```

-continued

```
Faults resolution order:
    Inking
    Cross Fold crooked
    Dog-ear
Faults resolution order (Reference):
    Cross Fold crooked
    Dog-ear
    Inking
Result of Situation 1: The current exercise is finished. (Student - Reference (%))
Copies:
    Number of copies saved (delivery): 15 - 21 (−28 %) of which 0 - 0 (0%) are no good
    Number of copies scrapped (waste): 705 - 427 (+65 %) of which 14 - 30 (−53 %) are
of acceptable quality
Time:
    Run time: 00:06 - 00:05 (+20 %)
    Web break and folder jam time: 00:00 - 00:00 (0%)
    Checks and actions time: 00:00 - 00:00 (0%)
    HelpLevelTime: 00:30 -_Situation1:00 (0%)
    TOTAL TIME: 00:36 - 00:05 (+620 %)
    Multimedia Time: 00:00 - 00:00 (0%)
Costs:
    Delivered copies cost: 2 - 3 (−33 %)
    Wasted copies cost: 105 - 0 (0%)
    Web break and folder jam cost: 0 - 0 (0%)
    Checks and actions cost: 0 - 0 (0%)
    Material Machine cost: 450 - 62 (+625 %)
    HelpLevelCost: 59 - 0 (0%)
    TOTAL COST: 617 - 129 (+378 %)
Statistics:
    Number of console adjustments: 2
    Number of menu check: 2
    Number of menu action: 1
    Number of press stop: 0
Final result: The current exercise is finished. (Student - Reference (%))
Copies:
    Number of copies saved (delivery): 15 - 21 (−28 %) of which 0 - 0 (0%) are no good
    Number of copies scrapped (waste): 705 - 427 (+65 %) of which 14 - 30 (−53 %) are
of acceptable quality
Time:
    Run time: 00:06 - 00:05 (+20 %)
    Web break and folder jam time: 00:00 - 00:00 (0%)
    Checks and actions time: 00:00 - 00:00 (0%)
    HelpLevelTime: 00:30 -_Situation1:00 (0%)
    TOTAL TIME: 00:36 - 00:05 (+620 %)
    Multimedia Time: 00:00 - 00:00 (0%)
Costs:
    Delivered copies cost: 2 - 3 (−33 %)
    Wasted copies cost: 105 - 0 (0%)
    Web break and folder jam cost: 0 - 0 (0%)
    Checks and actions cost: 0 - 0 (0%)
    Material Machine cost: 450 - 62 (+625 %)
    HelpLevelCost: 59 - 0 (0%)
    TOTAL COST: 617 - 129 (+378 %)
Statistics:
    Number of console adjustments: 2
    Number of menu check: 2
    Number of menu action: 1
    Number of press stop: 0
```

As seen in this overview file, the learner did the following unnecessary action: use of the Emergency Button to stop the press instead of the use of the Stop button. According to the template file, the use of the Densitometer and the use of the Help do not appear as unnecessary actions, even if the referent did not carry out these actions. The learner forgot the following actions: the use the Stop button and checking the Folding Knife Condition. The learner did not solve the mechanical problem (crooked Cross Fold and Dog-ear) before the inking problem.

Figure 11:
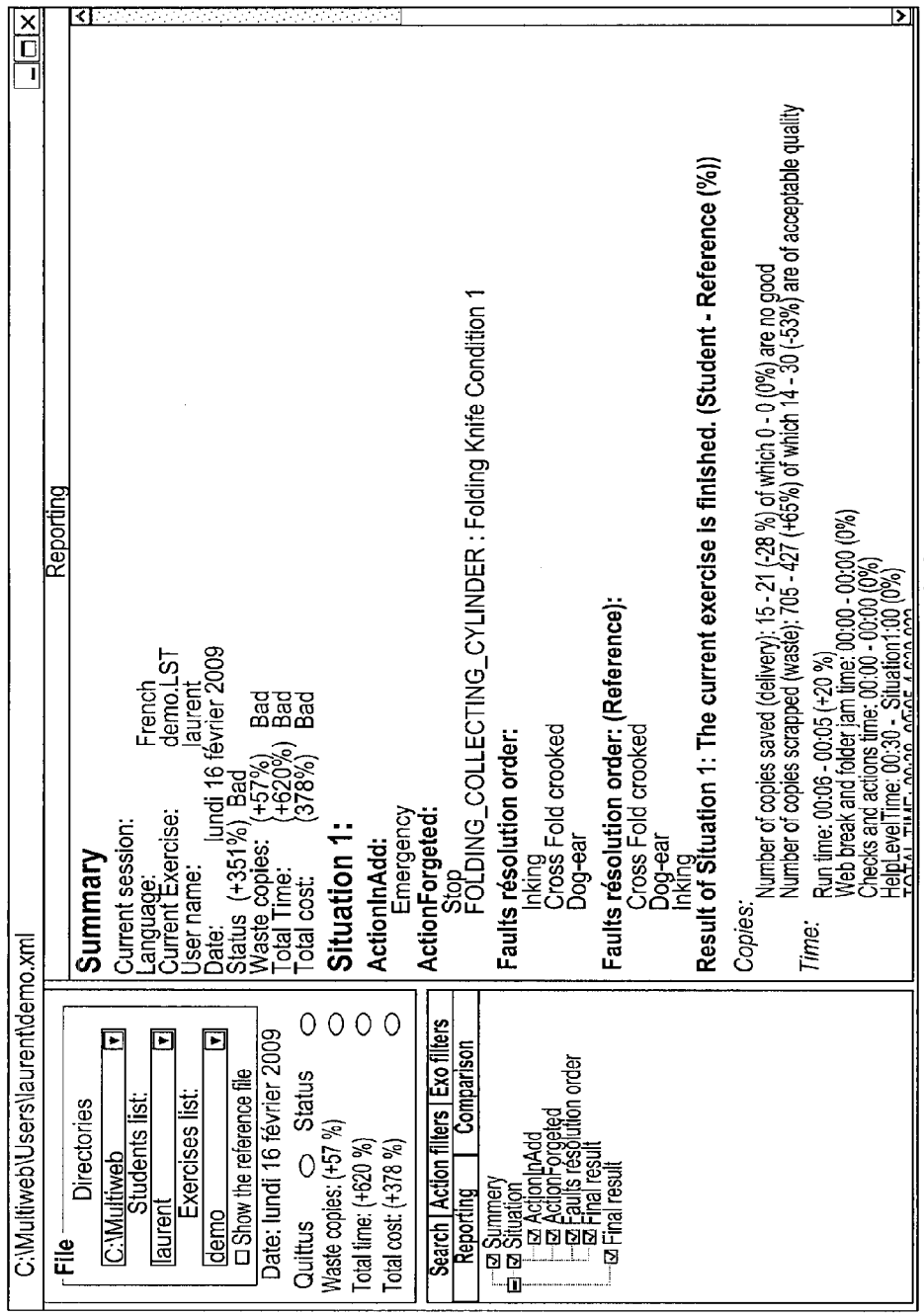
Figure 12:
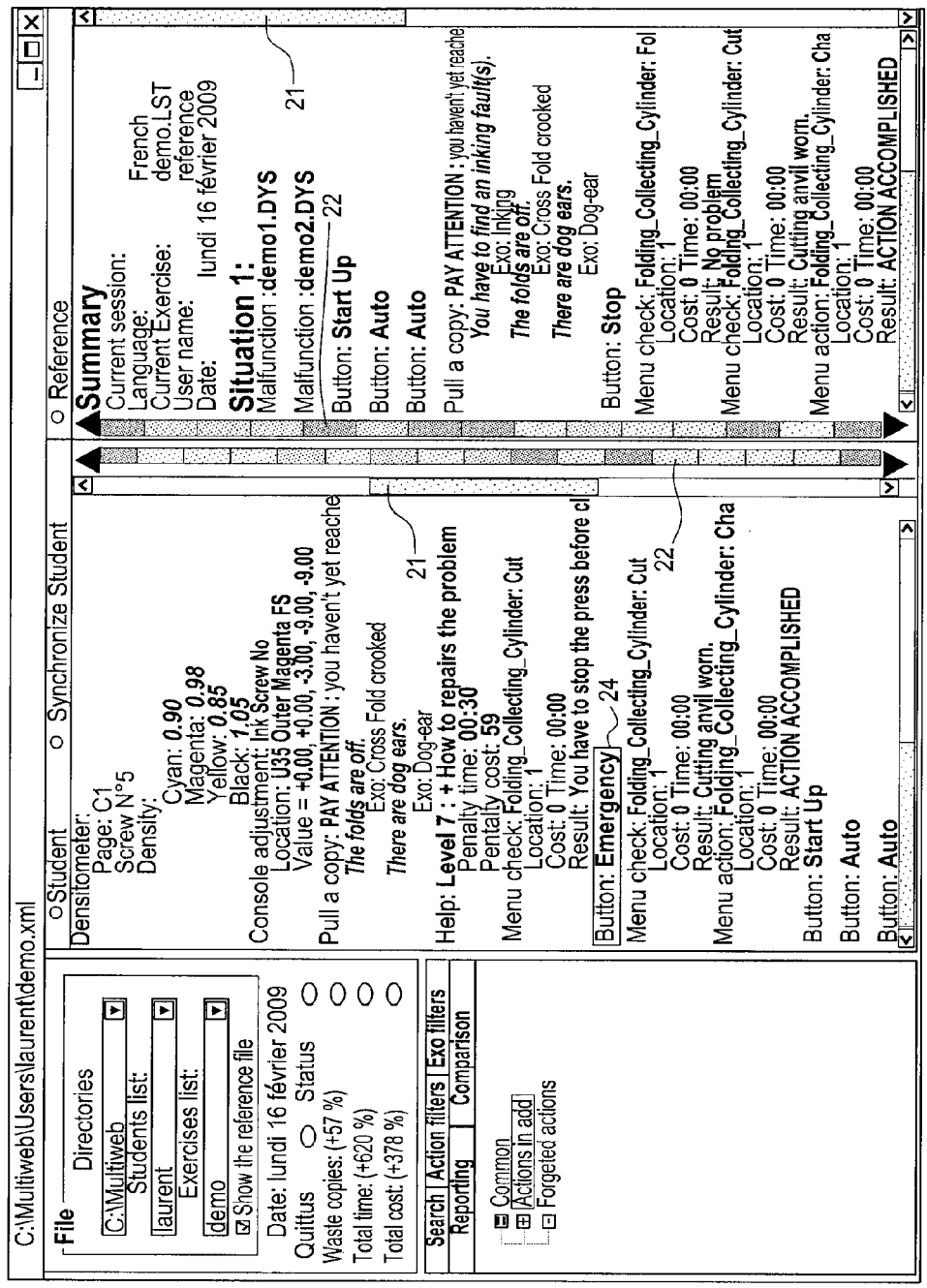

As illustrated in FIGS. 11 and 12, the system 6 can display the information contained in this overview file as described for the first example in reference to FIG. 4, and can implement the others displays previously described for the first example in reference to FIG. 4 through FIG. 10. The references 21, 22, and 24 have been already described for the first example.

Of course, the invention is not limited to the examples which have just been described and numerous amendments can be made to these examples without exceeding the scope of the invention.

What is claimed as new and desired to be protected by Letters Patent of the United States is:

1. A learning and training process, comprising:
    storing traces of a learner solving an exercise as learner traces on a non-transitory computer readable memory;
    using one or more computer processors to attach meta labels to the learner traces;
    using the one or more computer processors to compare the learner traces to reference traces of a referent solving the exercise, meta labels being attached to the reference traces;
    using a displaying device for:

displaying a visualization of at least one of the learner traces adjacent a visualization of at least one of the reference traces;

displaying a visual indication of actions common between the at least one of the learner traces and the at least one of the reference traces; and displaying a visual indication of actions different between the at least one of the learner traces and the at least one of the reference traces;

wherein the reference traces and the learner traces include indicators of:

modification in a simulated printing process;

observation in the simulated printing process; and measurement in the simulated printing process, and wherein the using the one or more computer processors to compare includes assessing virtual time and virtual costs for each action corresponding to the indicators of modification, observation and measurement.

2. The process according to claim 1, wherein in the meta labels are structured XML meta labels.

3. The process according to claim 1, wherein the one or more computer processors compares the learner tracers by deducing actions not performed by the learner in relation to those carried out by the referent.

4. The process according to claim 1, wherein the one or more computer processors compares the learner tracers by comparing a sequence in which problems of the exercise were solved.

5. The process according to claim 1, wherein the one or more computer processors compares the learner tracers by expressing in percentage a variance between referent results and learner results.

6. The process according to claim 5, wherein the referent results and the learner results comprise at least one trace corresponding to an action that is not necessary to solve the one or more problems.

7. The process according to claim 1, wherein the exercise is created by the referent.

8. The process according to claim 1, wherein the reference traces are created according to the following steps:

memorizing traces of the referent solving the exercise and storing the traces as reference traces in a computer readable memory device.

9. The process according to claim 1, wherein the meta labels of the learner traces are memorized in a learner trace file, and the meta labels of the reference traces are memorized in a reference trace file, the files containing only key words which are independent of a learner language.

10. The process according to claim 1, wherein the exercise contains a set of sequential situations, each situation containing one or more problems to solve, the learner having to solve each problem in a situation before moving on to the next situation.

11. The process according to claim 10, wherein the process further comprises: at the end of each situation, generating a summary for that situation including results of the learner concerning this situation.

12. The process according to claim 1, further comprising:

filtering the visualization of at least one of the learner traces and the visualization of at least one of the reference traces in order to display the traces corresponding to at least one of a given problem or situation and a given type of action made by the referent or the learner to solve the exercise.

13. The process according to claim 1, further comprising displaying the reference traces and learner traces on a display device at the same time.

14. The process according to claim 1 wherein the one or more computer processors compares learner traces by using a template file specifying a precision level for comparing the learner traces to the reference traces.

15. The process according to claim 1, wherein the process is implemented for a graphic arts industry as a print simulator.

16. The learning and training process of claim 1, further comprising:

using the one or more computer processors to assign the learner trace as a new reference trace, and to compare the new reference trace to a new learner trace including a description of a plurality of actions performed by a second learner.

* * * * *